United States Patent [19]

Maeder

[11] 4,170,307
[45] Oct. 9, 1979

[54] SERVICE MODULE

[76] Inventor: Edward C. Maeder, 616 Elm St., Wausau, Wis. 54401

[21] Appl. No.: 848,490

[22] Filed: Nov. 4, 1977

[51] Int. Cl.² ........................................... F16M 13/00
[52] U.S. Cl. .................................. 211/60 T; 211/163; 248/333; 248/337
[58] Field of Search ................... 211/60 R, 60 T, 115, 211/70, 78, 163; 248/317, 318, 320, 321, 326, 333, 336, 337, 406, 407, 411, 162; 312/223, 247

[56] References Cited

U.S. PATENT DOCUMENTS

| 1,685,445 | 9/1928 | Bash | 248/407 |
|---|---|---|---|
| 2,178,168 | 10/1939 | Gibson | 248/333 X |
| 2,195,162 | 3/1940 | Baxter | 248/333 X |
| 2,859,609 | 11/1958 | Tomchak | 248/333 X |
| 3,213,877 | 10/1965 | May et al. | 312/247 X |
| 3,774,773 | 11/1973 | Brent | 211/60 T |
| 3,776,389 | 12/1973 | Brent | 248/412 X |

Primary Examiner—William H. Schultz
Attorney, Agent, or Firm—Andrus, Sceales, Starke & Sawall

[57] ABSTRACT

A service module for bicycles comprising a housing having outer plastic panels to carry tools. In one form of the invention the housing is mounted for free rotation on the lower end of a telescopic support, and the support is spring biased to a retracted position so that the unit can be stored in an upper position. In use, the housing is pulled down and locked in a lower position. In a second form of the invention, the housing is adjustably mounted on the upper end of a supporting column and the housing can be rotated with respect to the column to provide access to the tools.

7 Claims, 5 Drawing Figures

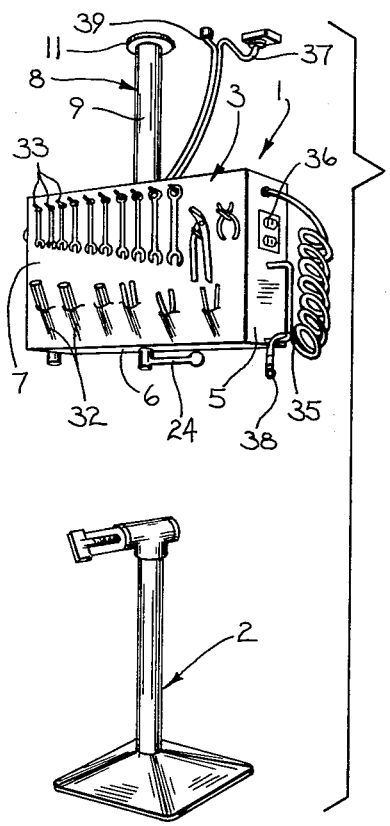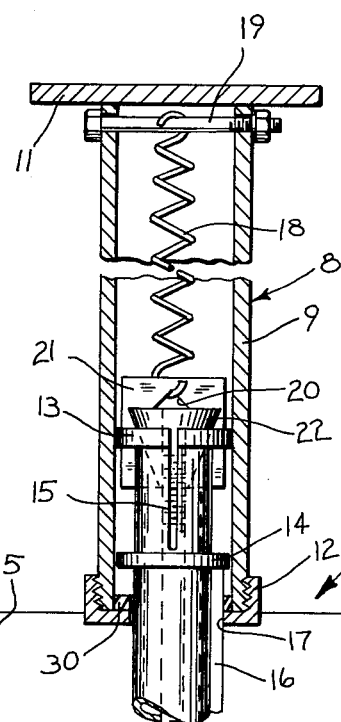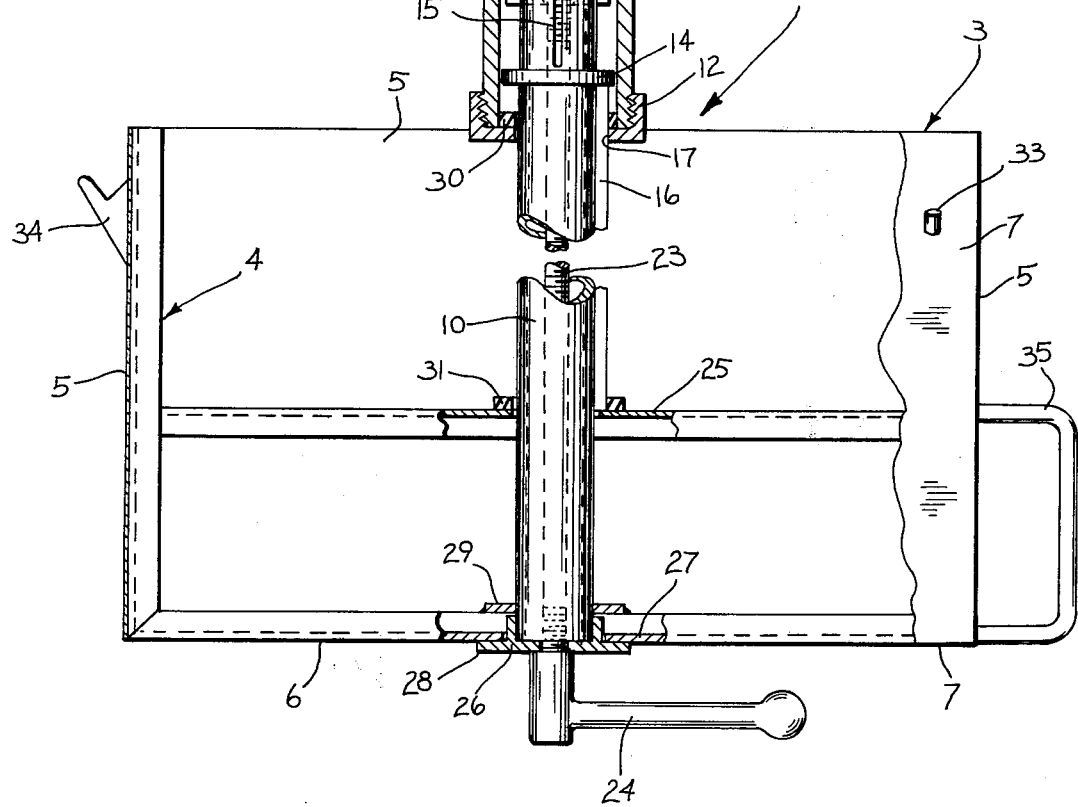
Fig. 1
Fig. 2

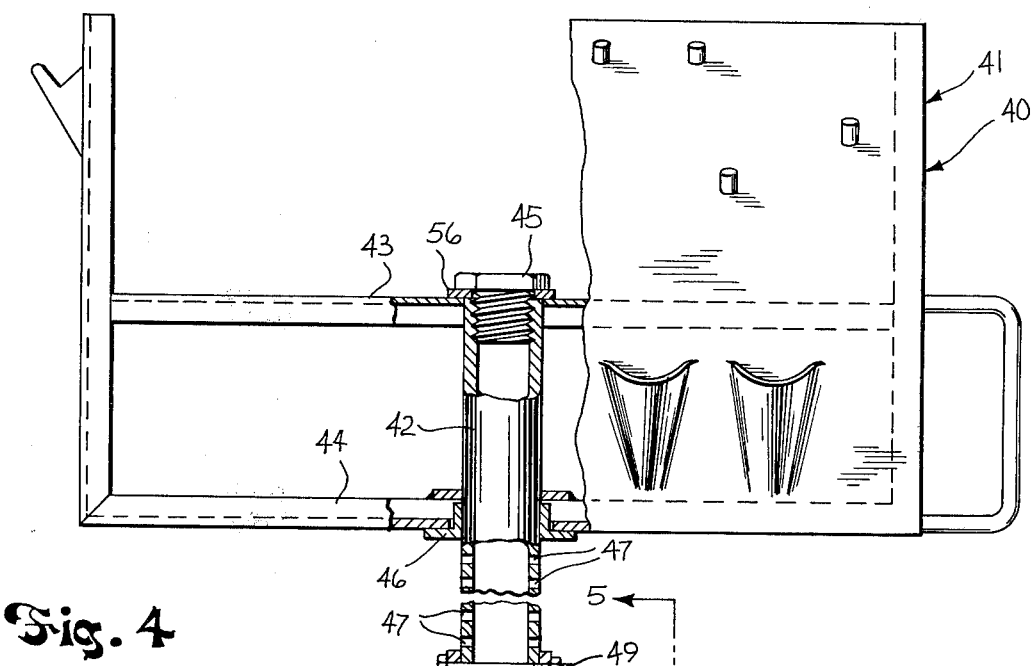
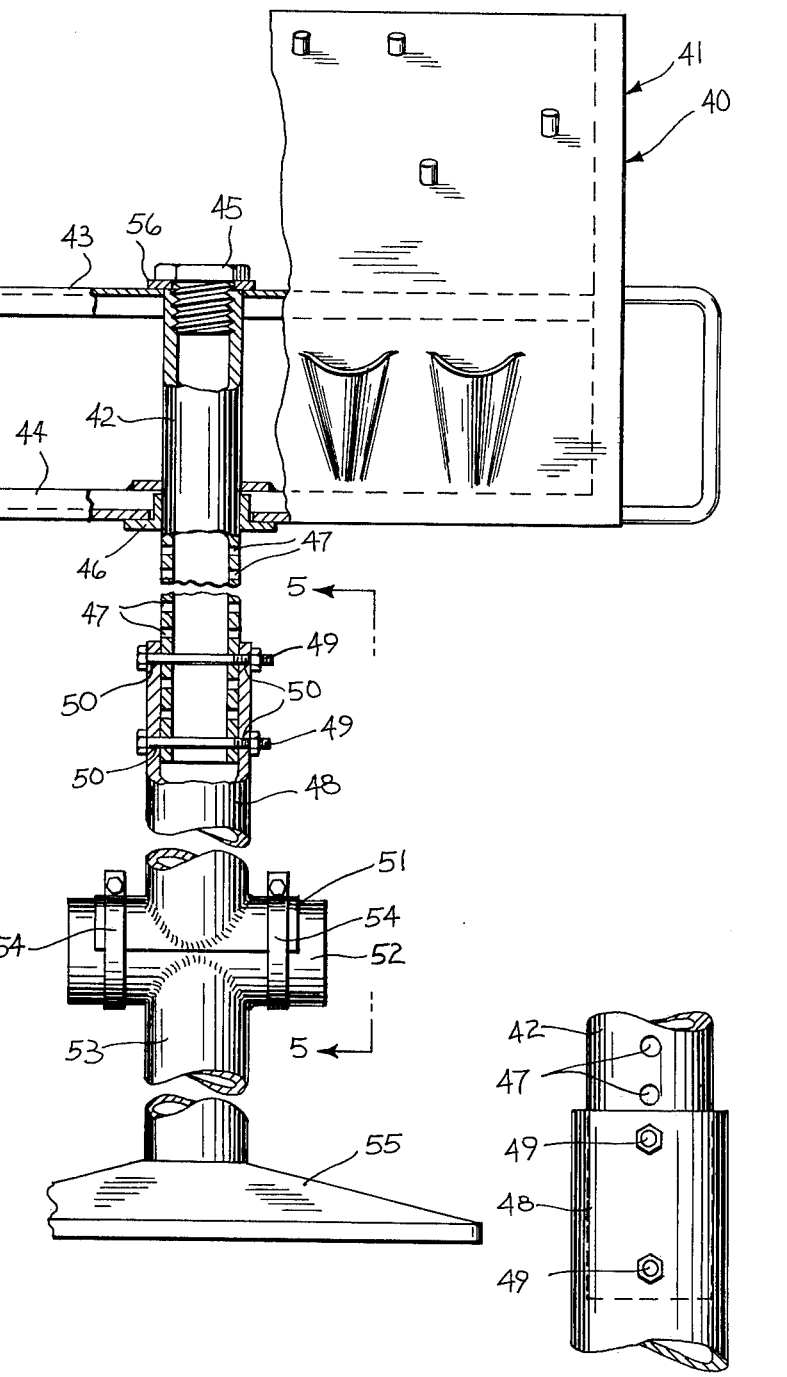
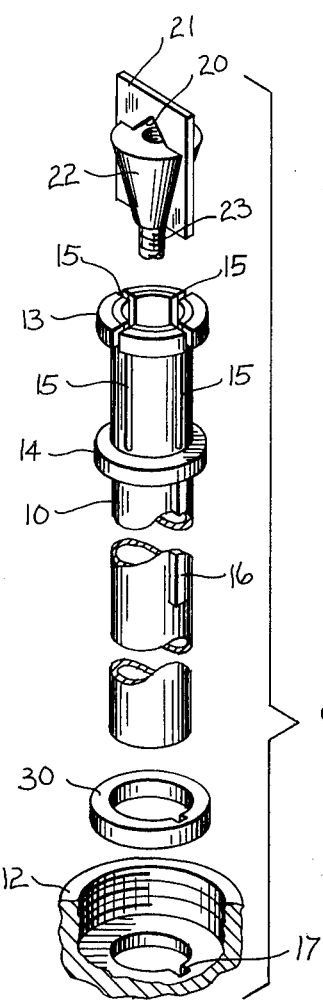
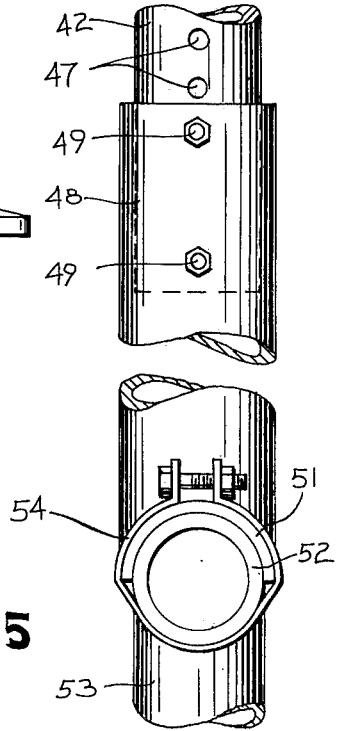
Fig. 4
Fig. 3
Fig. 5

SERVICE MODULE

BACKGROUND OF THE INVENTION

Bicycle and automative mechanics usually keep tools in a tool box or chest and normally there is no orderly arrangement of tools in the box. When tools are to be used it requires searching through the box for the desired tool, and after use of the tool, the tool is either laid aside or is returned to the box with no regard for arrangement. Because of the manner in which the tools are normally maintained, tools are often lost or misplaced and the overall time required for a repair operation is substantially increased.

SUMMARY OF THE INVENTION

The invention relates to an improved service module having particular use for repairing bicycles. The module includes a housing having outer molded plastic panels designed to carry a series of tools. In one form of the invention, the housing is carried by a telescopic support composed of an upper member which is connected to the ceiling or other elevated support, and a lower member that is attached to the housing. The telescopic members are spring biased to a retracted position so that the housing will be stored in an upper out-of-the-way position where it will not interfere with normal operations in the repair shop.

In use, the housing is pulled down to extend the telescopic members, and a handle located on the lower surface of the housing operates an internal locking mechanism that locks the telescopic members to thereby maintain the housing in a given position. The housing is freely rotatable with respect to the telescopic support so that the tools are readily accessible to the workman.

In a second or modified form of the invention, the housing is adjustably mounted on the upper end of a supporting columns or base. In this form of the invention, the housing is not retractable but the housing can be rotated with respect to the column to provide access to the tools on the various panels of the housing.

The panels of the housing are preferably formed of molded plastic and are provided with a series of pockets to receive tools such as pliers, screwdrivers, and the like. In addition, the panels are provided with a series of pegs to receive wrenches. This provides an orderly arrangement of tools, for the tools are readily accessible and can be returned to their proper location after use.

The housing also has provisions for an electrical power outlet and a pressurized air outlet.

As the service module is retractable, it can be moved to an upper position for storage where it will not interfere with normal operations in the workshop. At the time of use it can be lowered and locked in any desired position where the tools will be accessible to the workman.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view showing the service module of the invention as used in a bicycle repairing operation;

FIG. 2 is a longitudinal section of the service module with the housing being in a lower position;

FIG. 3 is an exploded view showing the locking mechanism;

FIG. 4 is a side elevation of a modified form of the invention in which the service module is supported from the ground; and FIG. 5 is a section taken along line 5—5 of FIG. 4.

DESCRIPTION OF THE PREFERRED EMBODIMENT

FIG. 1 illustrates the service module 1 of the invention as used in a bicycle repair operation. In this application of use, the bicycle is supported on a repair stand 2.

The service module 1 includes a housing 3 composed of a steel frame 4 including a pair of channel-shaped end members 5 and a channel-shaped bottom member 6, which support side panels 7.

The housing is supported from the ceiling or other elevated support by a telescopic support assembly 8 which enables the housing to be moved between an upper storage position and a lower working position. The support assembly 8 includes an upper tubular member 9 and a lower tubular member 10 which is slidable within the upper member. As best shown in FIG. 2, the upper end of upper member 9 is secured to a mounting plate 11 which is attached to the ceiling of the building or other elevated support. Threaded on the lower end of the upper member 9 is an end cap 12 having a central opening which receives the lower member 10.

A collar 13 or flange is located on the upper end of the member 10, and a second collar 14 of lesser external diameter than collar 13 is mounted beneath collar 13 and serves as a stop to limit the downward movement of the lower tubular member 10 with respect to the upper member 9.

As best illustrated in FIG. 3, the upper end portion of member 10 is provided with a series of longitudinal slots 15 which permit the upper end of the lower member 10 to be expanded outwardly to bring the collar 13 into engagement with the inner surface of member 9 to thereby prevent sliding movement between the two members.

To prevent rotation of the lower member 10 with respect to member 9, a longitudinal key 16 projects outwardly from the lower member and is received within a keyway 17 formed in end cap 12.

The lower tubular member 10 is spring loaded to the storage position by a spring 18 which is located within the member 9. As shown in FIG. 2, the upper end of the spring 18 is connected to a bolt 19 which extends through aligned openings in the upper end of member 9, while the lower end of the spring is connected within an opening 20 in a plate 21 that is integrally secured to a cone 22. As best illustrated in the exploded view, FIG. 3, the cone 22 is received within the upper split end of the lower member 10, and as the cone is moved downwardly, the upper end portion of member 10 will expand outwardly to thereby move the collar 13 into engagement with the inner surface of member 9 to lock the members 9 and 10 against movement.

To move the cone 22 with respect to tubular member 10, a rod 23 is threaded within the lower end of the cone and the rod extends through the tubular member 10. The lower end of the rod carries a handle 24 which is located on the lower surface of housing 3. As shown in FIG. 2, lower member 10 extends freely through an opening in channel member 25 of frame 4 and is secured to a base cup 26 which is mounted within an opening in the web 27 of channel member 6 of frame 4. Handle 24 bears against the lower surface of flange 28 of cup 26. The flange 28 of cup 26 serves as a bearing for rotation of housing 1 about the lower tubular member 10. In addition, an alignment ring 29 is mounted across the upper flanges of channel member 6 and aids in supporting the tubular member 10 for rotation with respect to frame 4. By rotating the handle 24 in one direction, the rod 23 will be threaded onto the cone 22 to draw the cone downwardly into the upper end of member 10, thereby expanding the upper portion of member 10 so that the collar 13 engages the inner surface of member 9 to thereby lock the members together. By rotating the handle 24 in the opposite direction, the cone 22 will be moved upwardly to thereby release the locking mechanism and permit the spring to retract the lower member 10 with respect to member 9.

As previously noted, collar 14 functions as a stop, and an annular resilient cushion 30 is located around the opening in end cap 12 and is adapted to be engaged by the collar 14 as the lower member 10 is extended, to thereby cushion the downward movement of the member 10. Similarly, an annular resilient cushion 31 is located on the channel 25 of frame 4 of housing 3 and is adapted to engage the lower surface of the end cap 12 when the telescopic support members are retracted through force of spring 18.

The side panels 7 are preferably formed of plastic and are molded with a series of pockets 32 to receive tools, such as screwdrivers, pliers, chisels, and the like. In addition, each of the side panels is provided with a series of pegs 33 that are adapted to hold wrenches. Located on one end member 5 is a pair of hooks 34 to hold a hammer, while the opposite end member 5 is provided with a handle 35 which can be used to rotate the housing 3 with respect to the support assembly 8.

An electrical outlet 36 is provided on one of the end members 5 and is connected by an electrical cord 37, which extends within the hollow interior of housing 3, to a suitable source of electrical power. In addition, a pressurized air coupling 38 is located on the same end member 5 and is connected by an air line 39 to a suitable source of air under pressure.

In operation, the housing 3 is normally in the upper storage position where it will not interfere with operation in the shop. When it is desired to use the service module, the housing 3 is pulled downwardly to the desired height and handle 24 is rotated to lock the housing in that position. The housing can then be rotated relative to the support assembly 8 to position the tools in an accessible location.

After use, the handle 24 is operated to release the locking mechanism, and the housing will automatically move to a retracted position under the force of the spring 18.

FIGS. 4 and 5 illustrate a modified form of the invention in which the service module 40 is free-standing and includes a housing 41 which is similar in construction to housing 3 of the first embodiment. A tube 42 extends vertically through aligned openings in the channel members 43 and 44 of housing 41 and thrust washer 56, and a locking cap 45 is threaded within the upper end of the tube. Secured centrally on the tube 42 is a base cup 46, similar to base cup 26, which supports the housing 41 for rotation.

The lower portion of tube 42 is provided with a series of holes 47, and the tube is connected to a mounting sleeve 48 by a pair of bolts 49 which extend through openings 50 in the mounting sleeve 48 and through holes 47 in tube 42. The holes 47 provide vertical adjustment for the tube 42 and housing 41.

The lower end of mounting sleeve 48 is secured to a saddle 51 which is mounted on the horizontal bar 52 of a T-shaped support 53. Clamping rings 54 encircle the bar 52 and saddle 51 on either side of the mounting sleeve 48 and clamp the saddle 51 to the bar 52.

The lower end of the support 53 is mounted on a base plate 55.

With the construction shown in FIGS. 4 and 5, a vertical adjustment is provided for the housing 41 with respect to the support 53, and the housing can be freely rotated with respect to the support.

The service module of the invention provides an orderly arrangement of tools which minimizes the time required to locate tools and therefore reduces the time required for a repair operation. As the housing which carries the tools is freely rotatable, the tools are readily accessible as are the electrical and air connections.

With the construction shown in FIGS. 1–3, the housing will be automatically retracted to an upper storage position on release of the locking mechanism where it will not interfere with normal operations in the shop. At the time of use, the housing can be lowered and locked in any desired elevation.

While the above description has illustrated the service module of the invention as used in a bicycle repair operation, it is contemplated that the service module can be used in automotive or marine repair shops as well as in other industrial and commercial installations.

Various modes of carrying out the invention are contemplated as being within the scope of the following claims particularly pointing out and distinctly claiming the subject matter which is regarded as the invention.

I claim:

1. A service module, comprising a housing to carry tools, telescopic support means connected to the housing and having an upper retracted position and a lower working position, said telescopic support means including a first tubular member secured to an external support and a second tubular member mounted for sliding movement with respect to said first member, said housing being mounted for rotation with respect to said second tubular member, biasing means for biasing the second member to the retracted position with respect to said first member, the upper end of said second member having provided with at least one longitudinal slot, a generally conical member disposed within the upper end of said second member, a rod threadedly engaged with said conical member and extending downwardly through said second member with the lower end of the rod projecting outwardly of said housing, and an operating member connected to the lower end of the rod and located on the lower surface of said housing, rotation of said operating member in one direction acting to draw the conical member inwardly of said second member to thereby expand the upper end of said second member outwardly into engagement with the inner surface of said first member to thereby lock said members against relative movement.

2. The service module of claim 1, and including means to prevent rotation of said second member with respect to said first member.

3. The service module of claim 1, and including a connecting member secured to said conical member, one end of said biasing means being connected to said connecting member and the opposite end of said biasing being connected to said first member.

4. The service module of claim 1, wherein said housing has an internal passage and includes an external panel, said panel having a series of pockets to receive tools.

5. The service module of claim 4, and including an electrical outlet disposed in said housing, and electrical leads connecting said outlet with an external source of electrical power and extending through said passage.

6. The service module of claim 4, and including pressurized air supply means mounted on said housing.

7. The service module of claim 1, and including mounting means for mounting the housing for rotation relative to said second member, said mounting means being operable to effect rotation of said housing when said members are locked against relative movement.

* * * * *

UNITED STATES PATENT AND TRADEMARK OFFICE
CERTIFICATE OF CORRECTION

PATENT NO. : 4,170,307
DATED : October 9, 1979
INVENTOR(S) : EDWARD C. MAEDER

It is certified that error appears in the above-identified patent and that said Letters Patent are hereby corrected as shown below:

Column 4, line 49, CLAIM 1, Cancel "having" and substitute therefor ---being---, Column 5, line 1, CLAIM 3, After "biasing" insert ---means---.

Signed and Sealed this

Twenty-second Day of April 1980

[SEAL]

Attest:

SIDNEY A. DIAMOND

Attesting Officer

Commissioner of Patents and Trademarks